J. O. GARRETT.
TRUCK BRAKE OR LOCK.
APPLICATION FILED AUG. 11, 1921.
1,420,999.
Patented June 27, 1922.
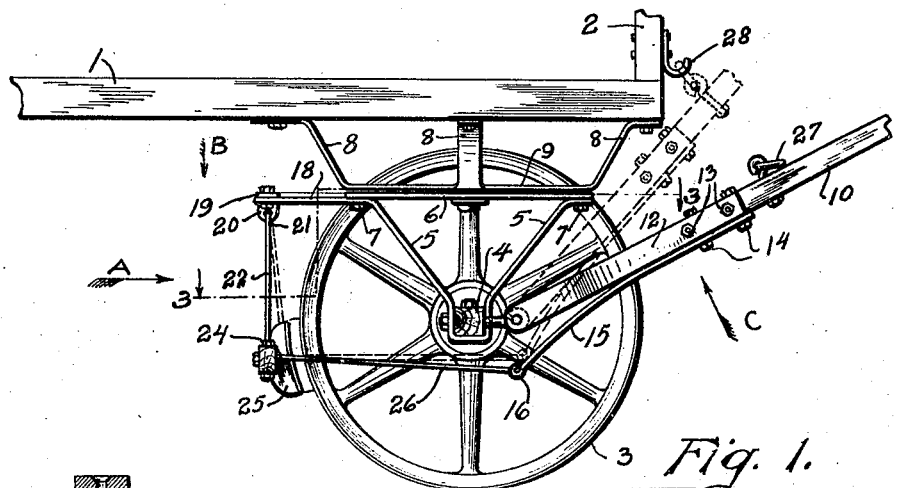
Fig. 1.
Fig. 5.
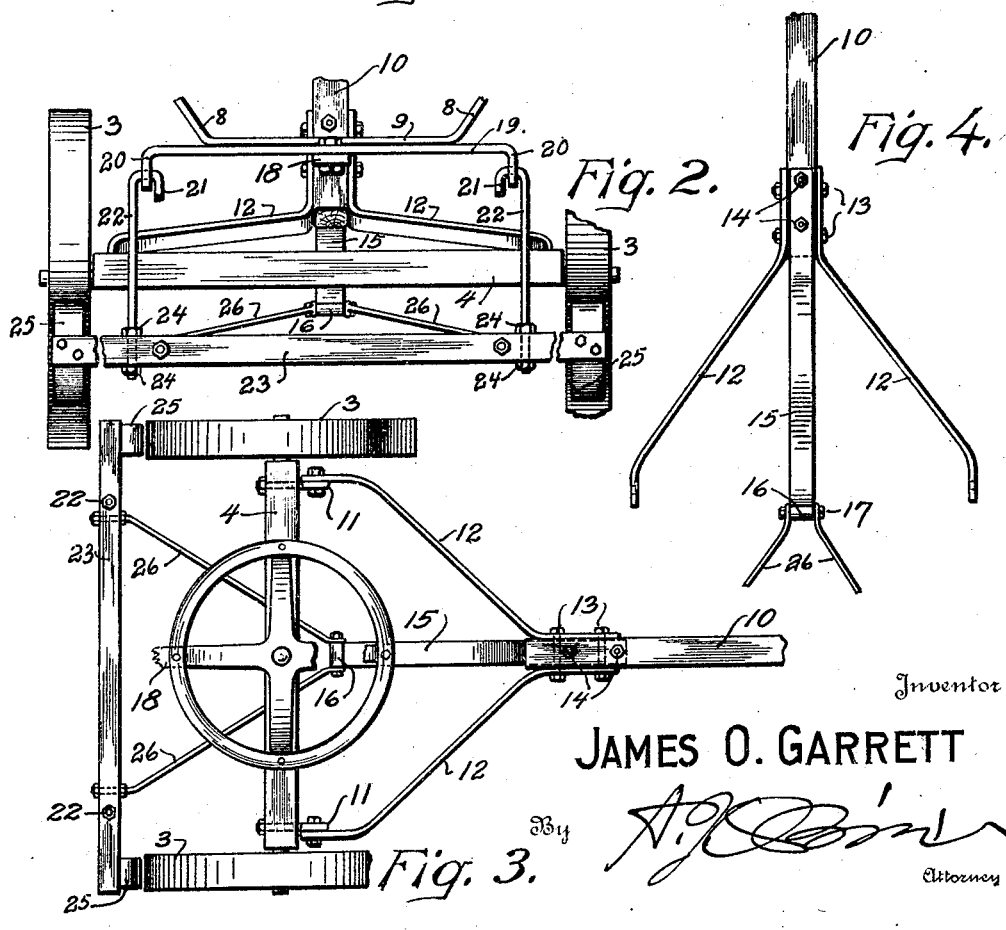
Inventor
JAMES O. GARRETT
By
Attorney

UNITED STATES PATENT OFFICE.

JAMES O. GARRETT, OF DENVER, COLORADO.

TRUCK BRAKE OR LOCK.

1,420,999.   Specification of Letters Patent.   Patented June 27, 1922.

Application filed August 11, 1921. Serial No. 491,371.

*To all whom it may concern:*

Be it known that I, JAMES O. GARRETT, a citizen of the United States, residing at the city and county of Denver and State of Colorado, have invented certain new and useful Improvements in Truck Brakes or Locks; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to brakes for vehicles and has special reference to brakes for baggage trucks of the type usually employed at railway stations for loading, unloading and transporting baggage.

Baggage trucks, of the type referred to above, are usually left on the depot platform and unless special care is taken by the attendants, it frequently happens that they become accidentally moved either by some unauthorized person or through the agency of the wind.

In the western prairie country where the wind attains a high velocity, it frequently happens that the baggage truck is blown from the platform and onto the railroad track. When this happens during the night, accidents are liable to occur from the resulting collision between the truck and the locomotive of a train.

In order to guard against accidents from the above source it has been proposed to provide the baggage trucks with brakes that shall be automatically set when the tongue is raised and hooked in its inoperative position.

I am aware that several different brakes have been designed and patented which have for their object to eliminate danger from the movement of the trucks through the agency of the winds or thoughtless and mischievous persons but they have been of a rather complicated nature and cannot be installed without considerable expense.

It is the object of my invention to produce a brake that is very simple in design, that requires no changes in the construction of the truck and which can be cheaply built and installed.

In order to more clearly describe my invention I shall refer to the accompanying drawing in which—

Fig. 1 is a side elevation of a portion of the front end of a truck, with the near wheel removed to show more clearly my brake mechanism.

Fig. 2 is a view taken in the direction of the arrow A in Fig. 1.

Fig. 3 is a view taken along line 3—3 Fig. 1 looking in the direction of arrow B.

Fig. 4 is a view of part of the tongue and its connecting parts looking in the direction of arrow C, Fig. 1, and Fig. 5 is a detail view showing the manner in which I secure the supporting bracket to the truck when I apply my brake to a truck which is not specially built to receive it.

The same reference characters will be used to indicate the same parts throughout the several views.

In Fig. 1 I show the usual truck body 1 with its upright front posts 2 supported on wheels 3 and axle 4 by means of the usual supporting brackets 5 whose upper ends are secured to the lower member 6 of the fifth wheel by means of bolts or rivets 7, the body 1 being supported by means of bracket members 8 which are integral with or firmly secured to the upper part 9 of the fifth wheel. Tongue 10 is hingedly connected to eyelets 11, which are secured to axle 4 in the manner shown, by means of properly bent members 12 which are secured to tongue 10 by bolts 13. Bolted to the lower face of tongue 10 by means of bolts 14 is a flat spring 15 whose end is provided with an eyelet 16 for the reception of a bolt 17, the purpose of which will hereinafter appear.

When a truck is built with the intention of equipping it with my brake, the rear part of bracket 5 is extended rearwardly as indicated at 18; to the end of this rearwardly projecting part 18 I bolt a transverse bar 19 having its ends 20 bent downwardly and provided with holes for the reception of the hooked ends 21 of supporting bars 22 whose other ends extend through brake beam 23 which is securely clamped in place by means of nuts 24. The ends of the brake beam are each provided with a brake shoe 25 for engaging with wheels 3. Two bars 26 have one end projecting through the brake beam 23 as shown in Fig. 3, the other ends being provided with eyelets through which bolt 17 extends. By this means the brake bar is connected to the end 16 of spring 15.

The operation of my brake is as follows: When tongue 10 is in its operative position (indicated in full lines in Fig. 1) the brake shoes 25 are held away from wheels 3. When it is desired to put the truck away or not use it, tongue 10 is raised into a position close to the front end of the truck body and ring 27 engaged with hook 28 in the manner indicated by the dotted lines in Fig. 1. End 16 of spring 15 moving about the pivots of the tongue, causes rods 26 and brake beam 23 to move forwardly until brake shoes 25 engage with wheels 3. Any further movement of the tongue then serves to flex spring 15 and apply pressure between the brake shoe and the wheel. It is seen from the above that the brakes are automatically set whenever the tongue is put into inoperative position and are removed when the tongue is brought down to operative position.

When my brake is applied to an existing truck I bolt a supporting member 18$^a$ to the rearmost member of bracket 5 in the manner shown in Fig. 5: this is the only alteration necessary to adapt the truck to receive my brake. Spring 15 is then bolted to the tongue and bar 19 to the rearwardly projecting support 18$^a$. The brake including members 19, 22, 23, 25, 26 and 15 may all be assembled in the shop.

From the above it appears that I have invented a brake that is exceedingly simple in design and which can be attached to existing trucks at a very small expenditure of labor and when so applied is automatic in its operation.

Having now described my improved brake, what I claim as my invention or discovery and what I desire to have protected by Letters Patent is:

1. The combination with a truck having a tongue adapted to be manually raised, of a brake beam operatively mounted adjacent a pair of the wheels, and resilient means carried by the tongue and connected in operative relation with the beam to be placed under tension during the raising of the tongue, and to move the beam into the brake-setting position during the tongue-raising act, and to resiliently retain the beam in such position when the tongue is raised.

2. The combination with a truck having a tongue adapted to be manually raised, of a brake beam operatively mounted adjacent a pair of wheels of the truck, and a spring carried by the tongue and connected in operative relation with the beam to be placed under tension during the raising of the tongue, and to move the beam into the brake-setting position during the tongue-raising act, and to yieldingly retain said beam in such position when the tongue is raised.

3. The combination, with a truck having a tongue adapted to be manually raised, of a brake beam operatively mounted adjacent a pair of wheels of the truck, and a leaf spring carried by the tongue and connected in operative relation with the beam to move the latter into the brake setting position during the raising of the tongue, and to yieldingly retain it in such position when the tongue is raised.

4. The combination, with a truck having a tongue adapted to be manually raised, of a brake beam operatively mounted adjacent a pair of the truck wheels, and a leaf spring having one extremity rigidly secured to the tongue and having its opposite extremity spaced from the tongue and connected in operative relation with the beam to move the latter into the brake setting position during the raising of the tongue, and to yieldingly maintain the said beam in such position when the tongue is raised.

5. The combination with a truck having the usual front axle and ground wheels, of a tongue hingedly connected with the axle, a brake adapted to be applied to the ground wheels and including a hingedly supported beam, a spring attached at one end to the tongue, and means for connecting the other end of the spring to the beam whereby as the tongue is raised the beam is moved into the brake-setting position and resiliently held in such position.

6. The combination with a truck having a body, an axle, ground wheels, fifth wheel, and a tongue hingedly connected to the axle, of a brake comprising a beam, a supporting bracket connected to the fifth wheel, a bar secured to said bracket and extending substantially parallel to the axle, suspension rods hingedly connected to the ends of said bar for supporting the beam, a leaf spring secured at one end to the tongue, and means for connecting the other end of the spring with the brake beam.

7. The combination with a truck, comprising an axle, ground wheels and a fifth wheel, of a support carried by the fifth wheel and projecting beyond the periphery of the ground wheels, a brake beam located to the rear of the ground wheels and hingedly connected to such support, a tongue pivotally connected to the axle, and a leaf spring having one end connected to the tongue, and means for operatively connecting the other end of the spring with the brake beam.

In testimony whereof I affix my signature.

JAMES O. GARRETT.